United States Patent [19]

Moris

[11] 4,325,087

[45] Apr. 13, 1982

[54] MAGNETIC MARKER FOR LOCATING A SPLICE WITHIN MAGNETIC TAPE

[75] Inventor: Alfred H. Moris, St. Paul, Minn.

[73] Assignee: Minnesota Mining and Manufacturing Company, St. Paul, Minn.

[21] Appl. No.: 125,966

[22] Filed: Feb. 29, 1980

[51] Int. Cl.³ .................. G11B 27/02; G11B 5/02; G11B 5/78
[52] U.S. Cl. .................... 360/13; 360/27; 360/134
[58] Field of Search ............ 360/13, 27, 28, 74.4, 360/74.5, 132, 134

[56] References Cited

U.S. PATENT DOCUMENTS

| | | | |
|---|---|---|---|
| 3,419,687 | 12/1968 | Stewart | 360/74.5 |
| 3,508,989 | 4/1970 | Lawrence et al. | 360/13 |
| 3,566,356 | 2/1971 | Holm et al. | 360/2 |
| 3,614,756 | 10/1971 | McIntosh et al. | 360/77 |
| 3,752,937 | 8/1973 | Mori et al. | 360/74.4 |
| 3,761,311 | 9/1973 | Perrington et al. | 117/239 |
| 4,054,924 | 10/1977 | Zimmermann | 360/74.4 |
| 4,090,662 | 5/1978 | Fayling | 360/2 |
| 4,230,909 | 10/1980 | Baum | 360/74.5 |

Primary Examiner—Vincent P. Canney
Attorney, Agent, or Firm—Cruzan Alexander; Donald M. Sell; Randall J. Gort

[57] ABSTRACT

A method of locating a splice within an endless loop of magnetic tape by detecting the presence of a magnetic marker attached to the magnetic recording tape wherein the magnetic marker is comprised of a magnetic layer having a flux density of at least 0.05 line of flux per centimeter of width, a thickness of not greater than 60 microns, and a coercivity of at least 1,000 oersteds, and which has a detectable magnetic pattern recorded thereon.

10 Claims, 6 Drawing Figures

MAGNETIC MARKER FOR LOCATING A SPLICE WITHIN MAGNETIC TAPE

BACKGROUND OF THE INVENTION

This invention relates to markers for locating a splice within an endless loop of magnetic tape.

Endless loop magnetic tape cartridges are currently utilized by the broadcast industry for prerecorded voice messages such as commercials. This use necessarily includes locating the beginning of the prerecorded message and positioning it within the cartridge so that it can be played upon being cued without blank or silient space prior to the message, or without starting the playback in the midst of the message. Initially recording the message at a position right after the splice allows one to later locate the message by locating the splice. In addition, it is desirable to locate the splice and prevent the recording thereon since the gap between the ends of the tape within the splice adversely affects the recording and playing back of information across the splice. In the commercial broadcast area, the effect of the splice on record/playback quality is sufficiently troublesome that manufacturers have developed various techniques for locating the splice. The most common technique is to utilize optical means, e.g. placing a light-reflective substance on the tape's surface over the splice, illuminating the tape's surface, and using a photodetector to detect and signal the reflected light when the splice passes. With this technique consideration must also be given to ambient light conditions and the optical degradation of the light reflective substance. An alternate method employs mechanical means, e.g. detecting a variance in the thickness of the tape in the vicinity of the splice. This method is cumbersome especially when different tape thicknesses are used. Both of the above-described methods also require hardware in addition to that already present for the playback of the tape. This additional hardware and systems increase the cost and add complexity to the tape handling device.

SUMMARY OF THE INVENTION

The present invention provides a reliable technique for marking and locating the splice in an endless loop of magnetic tape which utilizes the same magnetic playback head and essentially the same electronic circuitry required during the conventional playback of the recorded tape.

According to the present invention, the splice is marked via a magnetic marker having a residual flux density of at least 0.05 line of flux per centimeter width and a coercivity of at least 1000 oersted. This coercivity is of an adequately high magnitude to resist the unintentional erasure of a prerecorded magnetic pattern on the marker as the magnetic tape undergoes covential magnetic recording and playback operations. The prerecorded magnetic pattern on the high coercivity marker can however be detected and used to signal the location of the splice, and thus the location of the message.

In one embodiment of the invention the marker is incorporated into a splicing tape and used to form the splice. In this embodiment the splicing tape marker comprises a substratum having an adhesive coating on one of its surfaces adapted for adhering together the ends of the magnetic tape and a magnetizable layer on the surface of the substratum.

In a second embodiment of the invention the marker is provided by bonding a magnetizeable material to an endless loop of magnetic tape spliced by separate means, with the marker being located at a predetermined position adjacent the splice.

DESCRIPTION OF THE ACCOMPANYING DRAWING

The present invention will be further described hereinafter with reference to the accompanying drawing wherein.

DETAILED DESCRIPTION OF THE PREFERRED EMBODIMENT

Figure 1:
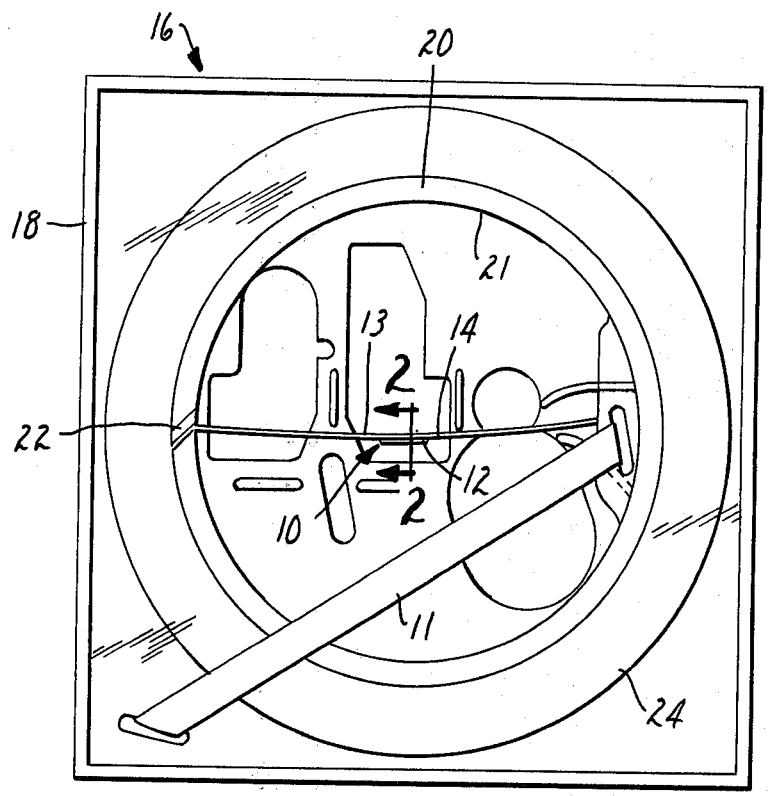
FIG. 1 is a top view of an endless loop of magnetic recording tape having a marker according to the present invention.
Figure 3:
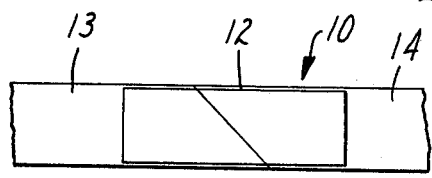
FIG. 3 is a side view of the section shown in FIG. 2.
Figure 2:
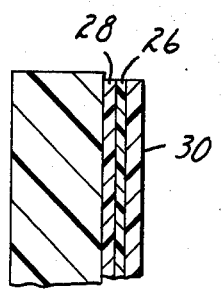
FIG. 2 is an enlarged fragmentary sectional view taken along line 2—2 of FIG. 1 showing a first embodiment of this invention.

Referring now to the drawing, there is shown in FIGS. 1, 2 and 3 a first embodiment of a magnetic marker 10 according to the present invention for marking the location of a splice forming a length of magnetic tape into an endless loop 11 in which the magnetic marker 10 is included in a length of splicing tape 12 joining two ends 13 and 14 of the length of magnetic tape. As is shown in FIG. 1, the endless loop of tape 11 is included in a magazine 16 comprising a housing 18 having a cylindrical hub 20 with a central opening 21 and a slot 22 extending axially across the full width of the hub 20 and communicating with the central opening 21. The endless loop of tape 11 has a major portion to form a coil 24 about the hub 20 and a minor portion extending from the inner most wrap of the coil 24 through the slot 22, partially across the central opening 21 and around the side surface of the coil 24 to the outer most wrap of the coil 24, all as is explained in greater detail in U.S. Pat. No. 4,293,882, the content whereof is incorporated herein by reference.

As is best seen in FIG. 2, the splicing tape 12 comprises a substratum 26 coated on one surface with an adhesive coating 28, and coated on its other surface with a magnetizable layer 30 which provides the marker 10. The substratum 26 is typically a thin (e.g., 25.4 micron thick) biaxially oriented film of polyethylene terephthalate. The adhesive coating 28 is a thin (e.g., 0.25 micron thick) coating of a low creep rubber based adhesive of the type used in the manufacture of splicing tapes for use with magnetic recording tapes. U.S. Pat. No. 3,787,531 incorporated herein by reference teaches a formulation for an adhesive which is typical of the type of adhesive used in such a construction. Through conventional coating techniques, the substratum 26 is coated with the adhesive 28.

The magnetizable layer 30 is coated onto the substratum 26 from a dispersion of magnetizable barium ferrite particles having an average diameter of 2.54 microns in a solution of organic binder. This dispersion is prepared by conventional techniques and is of a composition as described in the following table:

| Composition | Percentage by Weight |
| --- | --- |
| Barium ferrite | 43.44 |
| Estane ® 5703 (available from Goodrich) | 5.63 |
| Toluene | 11.59 |
| Methyl ethyl ketone | 32.46 |
| Phenoxy PKHH (available from Union Carbide) | 2.97 |
| Carbon Black | 1.74 |
| Wayfos ® TD100 (available from Philip A. Hunt Chemical Corp.) | 2.17 |

The dispersion is put into a coating tank along with ten parts by weight of a cross-linking agent viz., "PAPI" sold by the Polychemical Division of UpJohn Company. PAPI is a polymethylene polyphenyl isocyanate, having an average of 3.2 isocyanato groups per molecule. This dispersion is magnetically oriented by known techniques and then coated on the substratum 26 using conventional knurl coating techniques to provide a layer having a thickness of approximately 5 microns. The composite material is then heated to drive off the solvent and initiate the crosslinking of the binder material, and is stored for a few days to allow the cross-linking to be completed. Finally the completed tape is slit into widths of approximately 5½ mm for use with conventional ¼" magnetic recording tape.

Figure 5:
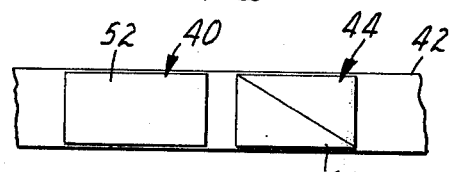
FIG. 5 is a front view of the invention as illustrated in FIG. 4.
Figure 4:
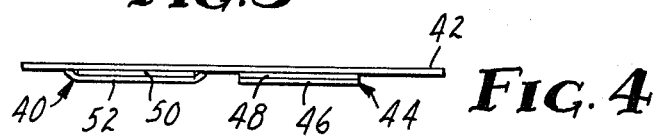
FIG. 4 is an enlarged fragmentary top view of an alternate embodiment of the present invention.

FIGS. 4 and 5 illustrate a second embodiment of a magnetic marker 40 according to the present invention in which the marker 40 is bonded to an endless loop of magnetic tape 42 having a splice formed with a length of conventional splicing tape 44, comprising a backing layer 46 and a coating of adhesive 48, and in which the marker 40 is bonded to the endless loop of tape 42 in a position spaced from the splice. As illustrated the marker 40 precedes and is spaced from the splicing tape 44 by a short distance e.g., 6-¾ centimeters. This distance is chosen to cooperate with the tape transports electronics to afford the stopping of the transport just after the splice has passed the playback head. Conventional electronic delay circuitry will, however, allow this distance to be at almost any predetermined value.

Preferably the marker 40 is bonded to the magnetic tape 42 by forming a magnetic layer 52 on a carrier web such as polyester or polyethylene terephthalate. The magnetic layer is coated from a dispersion of magnetizable barium ferrite particles having an average diameter of about 2.54 microns in a solution of suitable organic binder similar to that described for the magnetizable layer 30. This dispersion is coated and cross-linked as described above with reference to splicing tape 12. To aid in the adhesion of the magnetizable layer to the magnetic tape 42 a vinyl chloride-vinyl acetate type adhesive 50 is coated onto the magnetic layer by conventinal coating techniques. The resulting composite material is slit into 5½ mm widths. This is further subdivided into lengths, one of which is positioned at a predetermined position adjacent the splice and hot stamped or pressed against the magnetic recording tape 42 with the dispersion coated surface adjacent the magnetic tape 42. This construction is heated while under pressure to temperatures of approximately 160° to 190° C. via a heated die, whereupon the magnetic layer 52 adheres to the magnetic tape 42 after which the carrier or donor web can be peeled away leaving the layer of magnetizable material 52 embedded within the tape with its outer surface nearly flush with the surface of the tape 42.

In both embodiments of the marker 10 or 40 described above, the magnetic layer has a coercivity of approximately 3500 oersteds and a retentivity of approximately 0.1 line of flux and can be recorded with a magnetic pattern by using a magnetic recording head capable of producing an adequately high field strength. Such a recording technique is described in an article entitled "The Effects of Record Head Saturation on Digital Output", published in IEEE Transactions on Magnetics, Vol. MAG-12, No. 6, November 1976; incorporated herewith by reference. To allow an adequate duration of the recorded magnetic pattern and thus ensure sufficient time for detectability, the markers 10 or 40 generally have a length of from 1¼ to 2½ centimeters. This length facilitates at least 3 repetitions of a typical recorded pattern at conventional transport speeds.

Utilization of the marker can be in the form of an endless loop of magnetic tape purchased with a marker 40 already attached as is generally the case with the embodiment illustrated in FIG. 4. The marker 10 can also be purchased in the form of a roll of magnetic marker tape which can be attached by the user in forming a splice as illustrated in FIG. 2. Once the marker 10 is applied, the endless loop 11 can be recorded in a conventional manner with music or other desired content. Since the conventional cartridge recording techniques employ magnetic erase and record heads of approximately ⅓ the coercivity (e.g. 350 oersteds) of the magnetic marker, the prerecorded magnetic pattern is not disturbed during the recording operations.

Figure 6:
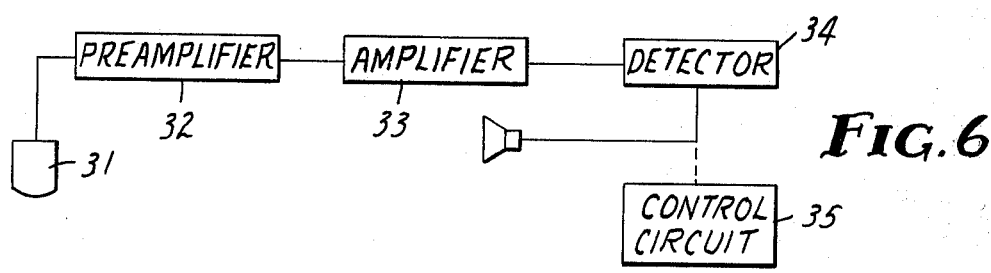
FIG. 6 is a schematic illustration of a system utilizing the present invention.

Upon playback of the endless loop of magnetic tape 11 with the conventional circuitry illustrated in FIG. 6, the recorded content as well as the magnetic pattern on the marker 10 will be detected. The components involved such as the magnetic playback head 31, the pre-amplifier 32, the amplifier 33, and the detector 34 are well known. Once detected, conventional control circuitry 35 can be used to sense the detected magnetic pattern and either signal the operator or stop the tape transport. It is desirable to delay the stopping of the transport until the splice has passed the playback head 31. This can be accomplished with known delay techniques.

Having thus described two preferred embodiments of this invention it should be understood that changes may be made in the size, shape, or configuration of some of the elements without departing from the spirit of the present invention as described in the appended claims.

I claim:

1. A marker adapted for locating a splice within an endless loop of magnetic tape said marker comprising a magnetic layer having a residual flux density of at least 0.05 line of flux per centimeter of width, a thickness of not greater than 60 microns, and a coercivity of at least 1000 oersteds, such that said magnetic layer is capable of having recorded thereon a detectable magnetic pattern and the high coercivity of said magnetic layer enables said pattern to resist erasure during conventional magnetic recording operations, means for attaching said magnetic layer to the endless loop of magnetic tape at a predetermined position with respect to said splice.

2. A marker adapted for forming and locating a splice within an endless loop of magnetic tape, said marker comprising a substratum, an adhesive coating on one surface of said substratum adapted for adhering together the ends of said tape to form said splice, and a magnetic layer on the surface of said substratum opposite said adhesive coating, said magnetic layer having a residual flux density of at least 0.05 line of flux per centimeter of width, a thickness of not greater than 60 microns and a coercivity of at least 1,000 oersteds, so that said magnetic layer is capable of having recorded thereon a detectable magnetic pattern and the high coercivity of said magnetic layer enables said pattern to resist erasure during conventional magnetic recording operations.

3. A marker as claimed in claim 2 wherein said high coercivity layer comprises barium ferrite.

4. In combination:
an endless loop of magnetic tape having a splice; and
a marker bonded to said tape at a predetermined position adjacent said splice, said marker comprising a layer of magnetic material, said layer having a residual flux density of at least 0.05 line of flux per centimeter of width, a thickness of not greater than 60 micron and coercivity of at least 1,000 oersteds so that said layer is capable of having recorded thereon a detectable magnetic pattern and the high coercivity of said layer enables said pattern to resist erasure during conventional recording operations, said layer being embedded within said magnetic tape with its outer surface nearly flush with the surface of said magnetic tape.

5. A marker as claimed in claim 4 wherein said layer of magnetic material comprises barium ferrite.

6. An endless loop of magnetic tape having a splice, and having a marker for locating said splice, wherein said marker comprises a substratum, an adhesive coating on one surface of said substratum for adhering together the ends of said tape to form said splice and a magnetic layer on the surface of said substratum opposite said adhesive coating, said magnetic layer having a residual flux density of at least 0.05 line of flux per centimeter width, a thickness of not greater than 60 microns and a coercivity of at least 1000 oersteds, so that said magnetic layer is capable of having recorded thereon a detectable magnetic pattern, and the coercivity of said layer enables said pattern to resist erasure during conventional magnetic recording operations.

7. A marker as claimed in claim 6 wherein said magnetic layer comprises barium ferrite.

8. A method of locating a splice within an endless loop of magnetic tape, said method comprising the steps of:
   a. providing a high coercivity magnetizable layer having a residual flux density of at least 0.05 line of flux per centimeter of width, a thickness of not greater than 60 micrometers, and a coercivity of at least 1,000 oersteds;
   b. attaching the high coercivity magnetizable layer to a portion of the tape, proximate to the splice;
   c. magnetically recording the high coercivity magnetizable layer with a detectable magnetic pattern; and
   d. detecting the detectable magnetic pattern with a magnetic playback head;
   e. actuating control circuitry to signal the presence of the detected marker.

9. A method according to claim 8 wherein step b includes the steps of coating the magnetizable layer on a substratum, providing an adhesive coating on the side of the substratum opposite the magnetizable layer and adhering the adhesive coating across adjacent ends of the tape so that the adhesive coated substratum secures the tape ends together, and provides the splice.

10. A method according to claim 8 wherein step b includes the steps of positioning the high coercivity magnetizable layer against one surface of the tape at a predetermined position adjacent the splice, and applying sufficient heat and pressure to the magnetizable layer so that the magnetizable layer is embedded within the tape with its outer surface nearly flush with the outer surface of the tape.

* * * * *